No. 768,744. Patented August 30, 1904.

UNITED STATES PATENT OFFICE.

SIMON GÄRTNER, OF HALLE-ON-THE-SAALE, GERMANY.

POLYCHLORAL AND PROCESS OF MAKING SAME.

SPECIFICATION forming part of Letters Patent No. 768,744, dated August 30, 1904.

Application filed May 6, 1904. Serial No. 206,774. (No specimens.)

*To all whom it may concern:*

Be it known that I, SIMON GÄRTNER, chemist, a subject of the German Emperor, residing at Halle-on-the-Saale, Germany, (and whose post-office address is 40 Albrechtstrasse, Halle-on-the-Saale, Germany,) have invented a certain new and useful Process for the Manufacture of Polychloral, (for which I have applied for a patent in Germany on the 7th day of August, 1903,) of which the following is a specification.

According to the *Annalen der Chemie* (171, 76) Meyer and Dulk have caused liquid trimethyl-amin to act on chloral, and thereby produced a solid mass which they assumed to consist of a mixture of several polymeric chlorals. The production of the reaction contained an admixture of an adhesive substance which could not be removed without causing decomposition of the entire product. Consequently it was not practicable to obtain the original product of the reaction between chloral and trimethyl-amin in a pure state.

I have discovered that a homogeneous and stable polychloral, $(C_2OHCl_3)_x$, may be obtained by causing trimethyl-amin or other amins to act on chloral in the cold and treating the product with acids, which polychloral has hypnotic properties and is a very useful soporific.

The details of procedure for the manufacture of polychloral may, for instance, be as follows: Chloral is treated with pyridin by adding the latter in drops while stirring and energetically cooling with ice until the mass begins to solidify, after which the stirring is continued until the mass has become quite hard. Subsequently the snow-white mass is rapidly broken up into small particles and shaken with about half its weight of dilute hydrochloric or other acid for about fifty minutes. The liquid is separated from the insoluble residue by suction and the latter washed with cold water until the washing-water no longer becomes acid.

The product thus obtained is subjected to pressure to remove any remnants of liquid, after which it is broken up into small particles and dried, preferably *in vacuo*, over concentrated sulfuric acid or phosphorus pentoxid. Instead of pyridin other amins—for instance, allyl-amins—may be used for polymerizing the chloral. The polymerization of chloral may also be effected in the presence of chemically-inert solvents. Chloral may, for instance, be dissolved in an equal weight of petroleum spirit, ether, or chloroform, after which a solution of dimethyl-amin (two per cent. of the weight of chloral) in the same solvent is added while cooling, and the mixture is allowed to stand in the cold for about two hours, during which time a solid white substance separates out, which is then drained. The purification of the product is again effected by shaking it with acids. Instead of dimethyl-amin trimethyl-amin may be used for polymerizing the chloral.

The polychloral obtained by the process described is a white solid substance which has a faint odor of chloral and differs from the polymeric chlorals already known by the fact of its being slowly soluble in water and alcohol already at ordinary temperature and more rapidly on heating, chloralhydrate or chloral-alcoholate being formed at the same time. When heated, it evaporates without melting, and it volatilizes slowly already at ordinary temperature. By alkalies it is split up into chloroform and formic acid. It has marked hypnotic properties and acts also as an anesthetic, and it is less poisonous than chloralhydrate.

What I claim is—

1. The process for the manufacture of a polychloral, which consists in causing chloral to act on an amin, while cooling, and treating the solid product thus obtained with dilute acid, substantially as described.

2. The process for the manufacture of a polychloral, which consists in adding to chloral pyridin in drops, while cooling and stirring, until the mass begins to solidify, again stirring until the mass has become quite solid, then breaking up the mass into particles, thoroughly shaking it with dilute hydrochloric acid, separating the liquid from the soluble residue, washing the latter and drying, substantially as described.

3. As a new article of manufacture, a polychloral, consisting of a solid and slightly volatile hypnotic and anesthetic substance, slowly soluble in cold water and in cold alcohol, more rapidly soluble in hot water and hot alcohol, while forming chloralhydrate or chloral alcoholate, capable of evaporation by heat without melting, and capable of being split up by alkalies into chloroform and formic acid, substantially as described.

In witness whereof I have signed this specification in the presence of two subscribing witnesses.

SIMON GÄRTNER.

In presence of—
   KARL MANTSCH,
   GUSTAV NICOLAI.